US012802571B2

(12) United States Patent
Liu

(10) Patent No.: US 12,802,571 B2
(45) Date of Patent: Nov. 17, 2026

(54) METHOD AND APPARATUS FOR ASSISTING VEHICLE LANE CHANGE

(71) Applicant: CARIAD (China) Co., Ltd., Beijing (CN)

(72) Inventor: Xiao Liu, Beijing (CN)

(73) Assignee: CARIAD (China) Co., Ltd., Beijing (CN)

( * ) Notice: Subject to any disclaimer, the term of this patent is extended or adjusted under 35 U.S.C. 154(b) by 0 days.

(21) Appl. No.: 19/032,413

(22) Filed: Jan. 20, 2025

(65) Prior Publication Data

US 2025/0239164 A1 Jul. 24, 2025

(30) Foreign Application Priority Data

Jan. 18, 2024 (CN) ......................... 202410075567.9

(51) Int. Cl.

| | |
|---|---|
| ***G08G 1/16*** | (2006.01) |
| ***B60W 30/18*** | (2012.01) |
| ***B60W 50/14*** | (2020.01) |
| ***G08G 1/052*** | (2006.01) |

(52) U.S. Cl.

CPC ....... *G08G 1/167* (2013.01); *B60W 30/18163* (2013.01); *B60W 50/14* (2013.01); *G08G 1/052* (2013.01); *B60W 2050/146* (2013.01); *B60W 2554/80* (2020.02)

(58) Field of Classification Search

CPC ................ G08G 1/167; G08G 1/1052; B60W 30/18163; B60W 50/14; B60W 2050/146; B60W 2554/80

See application file for complete search history.

(56) References Cited

U.S. PATENT DOCUMENTS

| | | | | |
|---|---|---|---|---|
| 10,671,866 | B2 * | 6/2020 | Ji | G06V 20/58 |
| 11,069,245 | B2 * | 7/2021 | Kim | B60K 35/28 |
| 2022/0194411 | A1 * | 6/2022 | Lee | B60K 35/10 |
| 2025/0046192 | A1 * | 2/2025 | Münning | B60W 30/18163 |
| 2025/0304071 | A1 * | 10/2025 | Chen | B60W 30/18163 |

FOREIGN PATENT DOCUMENTS

| | | | | |
|---|---|---|---|---|
| JP | 2007241439 | A | * | 9/2007 |
| JP | 2012247871 | A | | 12/2012 |
| JP | 2017016200 | A | * | 1/2017 |
| JP | 2023180955 | A | * | 12/2023 |

OTHER PUBLICATIONS

English Translation of JP2017 016200A Specification (Year: 2026).*
English Translation of JP2023 180955A Specification (Year: 2026).*
English Translation of JP2007 241439A Specification (Year: 2026).*

* cited by examiner

*Primary Examiner* — John A Tweel, Jr.

(74) *Attorney, Agent, or Firm* — ANOVA LAW GROUP, PLLC

(57) ABSTRACT

The present disclosure provides a method and an apparatus for assisting in vehicle lane change. The method comprises: determining a lane change safety status corresponding to a current lane change behavior of a vehicle; and dynamically displaying the lane change safety status to enable a driver to dynamically receive information about changes in danger level throughout an entire lane change process.

13 Claims, 8 Drawing Sheets

METHOD AND APPARATUS FOR ASSISTING VEHICLE LANE CHANGE

TECHNICAL FIELD

The present disclosure relates to the field of assisted control of vehicles, and particularly to a method and an apparatus for assisting in vehicle lane change.

BACKGROUND

With the continuous development of the automobile industry and continuous improvement of people's living standards, vehicles have become popular in people's daily use. However, during traveling, the vehicle is easily affected by other surrounding vehicles, for example, a vehicle driver cannot intuitively judge the current situation in several cases such as an acceleration, a constant speed or a slight deceleration of a following vehicle on a target lane in a lane change process. To avoid the occurrence of an accident, the driver may adopt an accelerated lane change method, which however, may affect the safety due to an insufficient acceleration and a too short vehicle distance sometimes, or adopt a braking and waiting method sometimes which causes miss of an opportunity of lane change due to hesitation.

To solve the problems above, in the related art, it is proposed to monitor a distance from the following vehicle and then remind the driver using buzzing in case of a too short distance. However, such reminding method makes the driver difficult to learn a risk intuitively, dynamically and in real time during the lane change and thus fail to better make a safe driving decision and to make a real-time adjustment according to the control over the vehicle.

Therefore, there is an urgent need to provide a visual assisted reminding method and apparatus capable of reflecting a lane change danger in real time and dynamically, so as to overcome the problems above.

It's to be noted that the information disclosed in Background above is merely used to enhance the understanding of the background of the present disclosure, and thus may contain information that constitutes the prior art known to those skilled in the art.

SUMMARY

To solve the problems existing in the prior art, the present disclosure provides a method and an apparatus for assisting in vehicle lane change, which can enable a driver to dynamically receive information about changes in danger level throughout an entire lane change process.

The method for assisting in vehicle lane change provided by the present disclosure comprises: determining a lane change safety status corresponding to a current lane change behavior of a vehicle; and dynamically displaying the lane change safety status that is determined in real time.

In some embodiments, dynamically displaying the determined lane change safety status comprises: dynamically displaying a safety level of the lane change safety status in a display apparatus of the vehicle.

In some embodiments, dynamically displaying the determined lane change safety status comprises: when the lane change safety status changes, controlling an indicator to change from a first lane change safety status determined at a previous moment to a second lane change safety status determined at a current moment.

In some embodiments, the first lane change safety status and the second lane change safety status are lane change safety statuses of different degrees of danger, and controlling an indicator to change from a lane change safety status determined at a previous moment to a lane change safety status determined at a current moment comprises: controlling the indicator to move from a first indication area corresponding to the first lane change safety status to a second indication area corresponding to the second lane change safety status.

In some embodiments, the first lane change safety status and the second lane change safety status are lane change safety statuses of the same degree of danger, and controlling an indicator to change from a lane change safety status determined at a previous moment to a lane change safety status determined at a current moment comprises: controlling the indicator to move from a first indication area corresponding to the first lane change safety status to a second indication area corresponding to the second lane change safety status.

In some embodiments, a distance between the first indication position and the second indication position is positively correlated to a degree of danger between the first lane change safety status and the second lane change safety status.

In some embodiments, determining a lane change safety status corresponding to a current lane change behavior of a vehicle comprises: acquiring a first speed and a first acceleration of a vehicle about to change lanes, and a second speed and a second acceleration of a target vehicle on a target lane; and determining, according to the first speed, the first acceleration, the second speed and the second acceleration, a lane change safety status corresponding to a current lane change behavior of the vehicle about to change lanes.

In some embodiments, determining, according to the first speed, the first acceleration, the second speed and the second acceleration, a lane change safety status corresponding to a current lane change behavior of the vehicle about to change lanes comprises: determining, according to the first speed and the first acceleration, a first travel distance of the vehicle about to change lanes when the vehicle about to change lanes is expected to complete lane change; determining a second travel distance of the target vehicle when the vehicle about to change lanes is expected to complete lane change according to the second speed and the second acceleration; and determining, according to the first travel distance and the second travel distance, a lane change safety status corresponding to the current lane change behavior of the vehicle about to change lanes.

In some embodiments, determining, according to the first travel distance and the second travel distance, a lane change safety status corresponding to the current lane change behavior of the vehicle about to change lanes comprises: acquiring an initial distance between the vehicle about to change lanes and the target vehicle; determining a predicted distance between the vehicle about to change lanes and the target vehicle according to the first travel distance, the second travel distance and the initial distance; and determining, according to the predicted distance, a safety level of the lane change safety status corresponding to the current lane change behavior of the vehicle about to change lanes.

In some embodiments, determining, according to the predicted distance, a safety level of the lane change safety status corresponding to the current lane change behavior of the vehicle about to change lanes comprises: determining, according to the predicted distance and distance thresholds of lane change safety levels corresponding to different degrees of danger, a lane change safety level corresponding to the current lane change behavior of the vehicle about to change lanes.

In some embodiments, the method further comprises: collecting, using an image collecting apparatus, image information of the target vehicle on the target lane; and determining the second speed and the second acceleration of the target vehicle on the basis of the image information of the target vehicle.

In some embodiments, the method further comprises: collecting, using a radar measuring apparatus, distance information of the target vehicle on the target lane; and determining the second speed and the second acceleration of the target vehicle on the basis of the distance information of the target vehicle.

In some embodiments, the method further comprises: displaying the second acceleration and/or a variation trend of the second acceleration of the target vehicle in the display apparatus of the vehicle about to change lanes.

According to another aspect of the present application, further provided is an apparatus for assisting in vehicle lane change, comprising:

a determination module, configured to determine a lane change safety status corresponding to a current lane change behavior of a vehicle; and a display module, configured to dynamically display the determined lane change safety status.

According to another aspect of the present application, provided is a computer device, comprising a memory, a processor, and a computer program stored on the memory and runnable on the processor, wherein the processor, when executing the program, implements the steps of the method for assisting in vehicle lane change as described above.

According to another aspect of the present application, provided is a computer-readable storage medium, storing a computer program thereon, wherein the program, when executed by a processor, implements the steps of the method for assisting in vehicle lane change as described above.

According to another aspect of the present application, provided is a computer program product, comprising a computer instruction, wherein the computer instruction, when executed by a processor, implements the steps of the method for assisting in vehicle lane change as described above.

With the method and the apparatus for assisting in vehicle lane change proposed in the embodiments of the present application, by determining the lane change safety status corresponding to the current lane change behavior of the vehicle and dynamically displaying the lane change safety status that is determined in real time, a driver can be enabled to dynamically receive variation information of a danger status in the entire lane change process, which thus effectively assists in making a real-time adjustment to the control over the vehicle according to a dynamic reminding, leading to improved convenience of the driver and comfort of a passenger.

BRIEF DESCRIPTION OF THE DRAWINGS

The described and other features of the present disclosure are illustrated below in detail with reference to the particular example embodiments shown in the drawings. The example embodiments are given herein by way of illustration and thus do not limit the present disclosure, and in the drawings.

DETAILED DESCRIPTION OF THE EMBODIMENTS

The present disclosure is described below in detail through particular embodiments to enable those of ordinary skill in the art readily to practice the present disclosure according to the disclosure of this description. The embodiments described below are only part, but not all, of the embodiments of the present disclosure. All other embodiments obtained by those of ordinary skill in the art on the basis of the embodiments described in the description without creative effort shall fall within the scope of protection of the present disclosure. It should be noted that the embodiments and the features in the embodiments in the description can be combined with each other under the circumstances that there is no conflict.

The terms as used herein are only used for the purpose of illustrating particular embodiments, instead of limiting the present disclosure. Unless otherwise particularly indicated in the context, the single form of "a", "an" and "the" as used herein also include the plural form of "a plurality of", "multiple" and "these". The words such as "first", "second", etc. as used herein are merely used to distinguish between different features, steps, operations, elements and/or components, etc., but neither represent any specific technical meaning nor represent a necessary logical sequence therebetween. The word "a plurality of" as used herein may refer to two or more, and the word "at least one of" may refer to one, two or more. Any feature, step, operation, element and/or component as mentioned herein may be generally construed as one or more features, steps, operations, elements and/or components unless otherwise specifically indicated in the context. It should also be understood that the words "comprise" and/or "include" as used herein refer to the presence of the described feature, step, operation, element and/or component, but does not preclude the presence or addition of one or more other features, steps, operations, elements, components and/or sets thereof. The word "and/or" as used herein include any or all combinations of one or more listed relevant items. The suffixes "module" and "unit" to elements herein are merely used for ease of description as they can be used interchangeably and do not have any distinguishing meaning or function.

For the prior art correlated to the illustration of the present disclosure that is apparent to those skilled in the art, detailed description thereof is omitted. It should also be understood that the description of all embodiments in this description focuses on the differences among them, and the reference may be made to each other for the same or similar points among the embodiments, which are no longer repeated herein for brevity.

Figure 1:
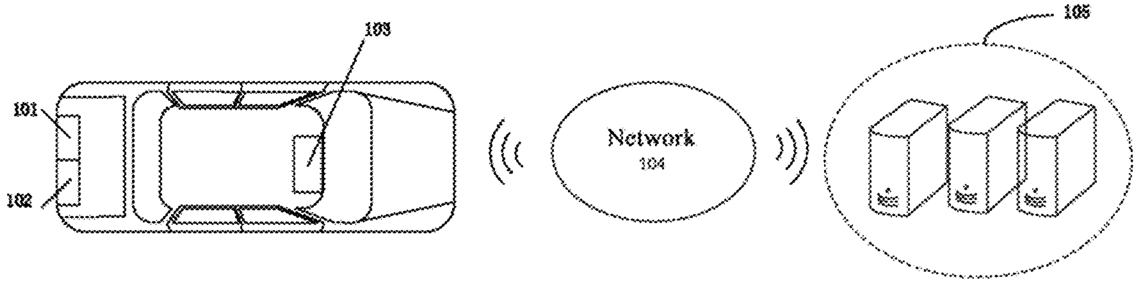
FIG. 1 shows an exemplary system architecture applicable to a particular embodiment of a method for assisting in vehicle lane change of the present disclosure.

As illustrated in FIG. 1, an example system architecture 100 applicable to a particular embodiment of a method for assisting in vehicle lane change of the present disclosure is shown. The system architecture 100 may comprise a radar measuring apparatus 101, an image collecting apparatus 102, a vehicle-mounted terminal 103, a network 104 and a server 105. The network 104 is configured to provide communication among the radar measuring apparatus 101, the image collecting apparatus 102, the vehicle-mounted terminal 103 and the server 105, and may include various types of connections, e.g., wired and wireless communication or fiber-optic cables, etc.

The radar measuring apparatus 101 and the image collecting apparatus 102, disposed around a vehicle body, may be configured to measure distance information between a surrounding vehicle and the vehicle body and collect image information of the surrounding vehicle, respectively. The radar measuring apparatus 101 and the image collecting apparatus 102 may interact with the server 105 over the network 104 to send the measured distance information between the surrounding vehicle and the vehicle body and the image information of the surrounding vehicle to the server 105 over the network 104, such that the server 105 determines a lane change safety level on the basis of the distance information between the surrounding vehicle and the vehicle body and the image information of the surrounding vehicle, and sends same to the vehicle-mounted terminal 103 over the network 104.

A user may interact with the server 105 using the vehicle-mounted terminal 103 over the network 104. Various communication client applications may be installed on the vehicle-mounted terminal 103, for example, an image and video shooting application, a text input application, a web browser application, a professional field application software, a searching application, an instant messaging tool, an email client, a social platform software, etc.

During particular implementation, the vehicle-mounted terminal 103 may be implemented as hardware or software as appropriate. The vehicle-mounted terminal 103, when implemented as hardware, may be various electronic devices that have a (touch) display screen and support various inputs such as voice, text and the like, including, but not limited to, a personal computer (including a notebook computer and a desktop computer), a tablet, a smartphone, a vehicle-mounted terminal, an e-book reader, a video player, etc. The vehicle-mounted terminal 103, when implemented as software, may be installed in a suitable electronic device to function as multiple software or software modules (e.g., for providing distributed service) or as single software or a software module. It should be understood that the instance of the vehicle-mounted terminal 103 described in FIG. 1 and above is only an example herein, and should not be construed as particular limitations.

The server 105 may be one that provides various services, for example, various information input to the vehicle-mounted terminal 103, such as a back-end server providing processing such as analysis, response, and support, etc. to a control signal, voice or text information. The back-end server may perform processing such as analysis, etc. on the information such as the received control signal, voice and target text and feeds back a processing result to the vehicle-mounted terminal 103 over the network 104.

During particular implementation, the server 105 may be implemented as hardware or software as appropriate. The server 105, when implemented as hardware, may be implemented as a distributed server cluster consisting of a plurality of servers or as a single server. The server 105, when implemented as software, may be implemented as multiple software or software modules (e.g., for providing distributed service) or as single software or a software module. It should be understood that the instance of the server 105 described in FIG. 1 and above is only an example herein, and should not be construed as particular limitations.

It is to be noted that the method for assisting in vehicle lane change provided in the embodiments of the present application may be performed by the vehicle-mounted terminal 103, or by the server 105 or jointly by the vehicle-mounted terminal 103 and the server 105. Accordingly, the apparatus for assisting in vehicle lane change may be disposed in the vehicle-mounted terminal 103, or in the server 105, or in both the vehicle-mounted terminal 103 and the server 105.

It may be understood that the system architecture 100 above may not comprise the network 104 and the server 105 when the method for assisting in vehicle lane change provided in the embodiments of the present application is performed by the vehicle-mounted terminal 103.

It should be understood that the number and category of the terminal devices, networks and servers in FIG. 1 are merely schematic. During particular implementation, there may be any number and category of terminal devices, networks and servers according to practical requirements.

Figure 2:
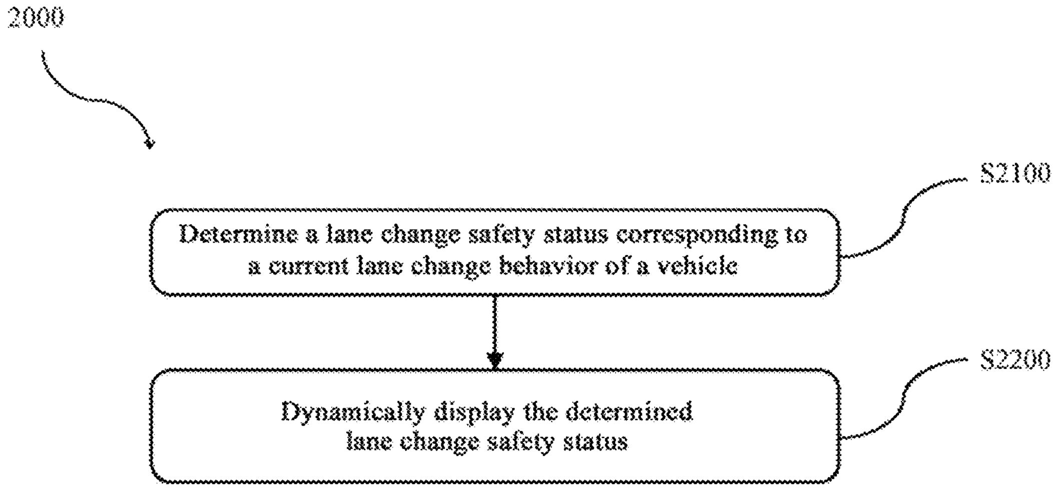
FIG. 2 shows a flowchart of a method for assisting in vehicle lane change according to an embodiment of the present disclosure.

As shown in FIG. 2, the present disclosure provides a method 2000 for assisting in vehicle lane change. In particular, the method 2000 for assisting in vehicle lane change is performed by the server 105, and comprises:

S2100: a lane change safety status corresponding to a current lane change behavior of a vehicle is determined.

It is to be noted that the lane change safety status corresponding to the current lane change behavior may be evaluated for all traveling vehicles, i.e. a lane change safety status corresponding to an active lane change behavior of a vehicle with a lane change tendency, or a lane change safety status of a vehicle without a lane change tendency passively caused by a lane change behavior of other vehicles, etc.

The vehicle with the lane change tendency may be a vehicle about to change lanes, and the current vehicle may be determined as a vehicle about to change lanes in a about-to-change-lane state (with a lane change tendency) according to the control of a driver, for example, the vehicle is determined as a vehicle about to change lanes when it is monitored that the driver triggers a turn signal lamp and a steering angle of a steering wheel is smaller than a preset angle. That is, it is determined that the driver is intended to control the vehicle to change a lane when the driver has a steering demand, instead of a steering operation.

In particular, a lane change safety level corresponding to the current lane change behavior of the vehicle about to change lanes may be determined in real time according to a preset frequency.

The preset frequency is determined according to computing power capable of being provided by a computing device. A higher frequency may be selected as the preset frequency when the server or the vehicle-mounted terminal has higher computing power, and a lower frequency may be selected as the preset frequency when the server or the vehicle-mounted terminal has a lower computing power. The present application does not impose specific limitations thereto.

It should also be noted that the lane change safety level corresponding to the current lane change behavior of the vehicle about to change lanes is a degree of danger that the vehicle about to change lanes faces when the vehicle about to change lanes completes lane change according to the current driving behavior.

S2200: the determined lane change safety status is dynamically displayed.

In a feasible embodiment, the safety level of the lane change safety status may be dynamically displayed in a display apparatus of the vehicle about to change lanes, wherein the display apparatus of the vehicle includes, but is not limited to, a central control panel or a head-up display system.

Figure 3A:
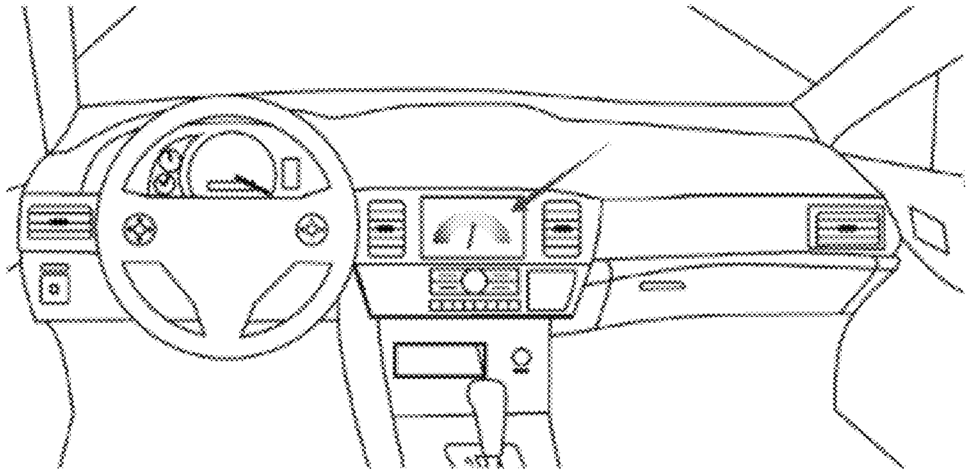
FIGS. 3*a* and 3*b* show displaying position effect diagrams according to an embodiment of the present disclosure.
Figure 3B:
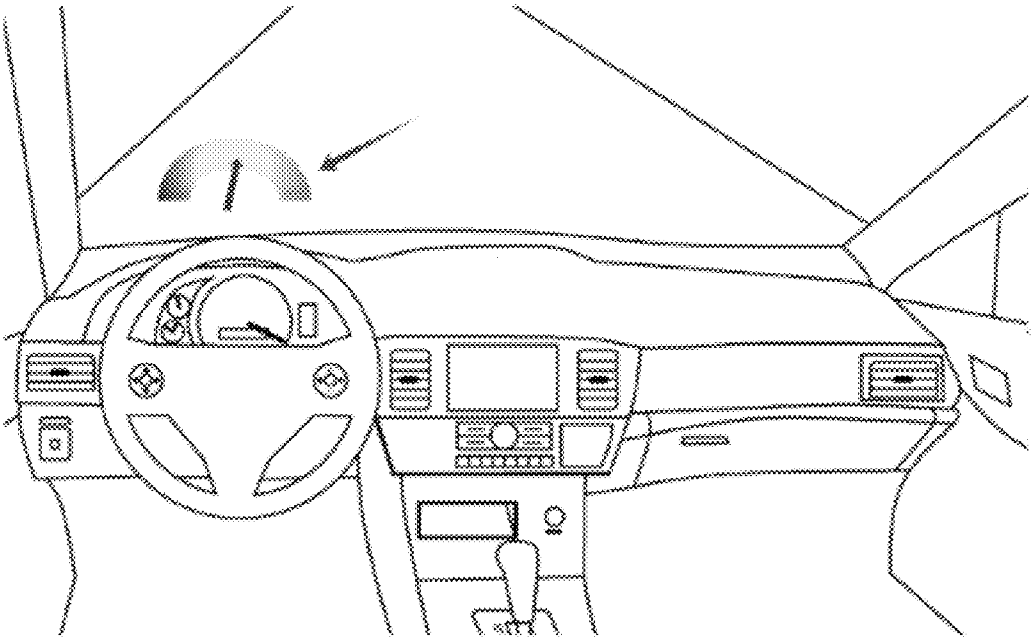

In an example, when the vehicle about to change lanes has a central control panel, the lane change safety level may be dynamically displayed through the central control panel as shown in FIG. 3*a*, or when the vehicle has a head-up display (HUD) system, it may be displayed by projection to a windshield corresponding to the driver of the vehicle about to change lanes as shown in FIG. 3*b*.

It is to be noted that the dynamic displaying of the lane change safety status is mainly embodied when the safety level of the lane change safety status changes, thus displaying a change process or a change result. The safety level may be represented by various ways, for example, it may be a factor, a color change, or a continuous progress bar, or the like. The embodiment of the present application takes dashboard-type progress bar shown in FIGS. 3*a*-3*b* as an example.

In particular, when the lane change safety level changes, an indicator is controlled to change from a first lane change safety level determined at a previous moment to a second lane change safety level determined at a current moment.

That is, when the first lane change safety level determined at a previous moment at the preset frequency is inconsistent with the second lane change safety level determined at the current moment, it is determined that the lane change safety level changes. In that case, the indicator for indicating the lane change safety level changes, i.e. from the first lane change safety level to the second lane change safety level.

It should be understood that there may be different ways of change when the way of displaying or the indicator is different. In an embodiment of the present application, multiple road safety levels may be displayed through a dashboard shown in FIGS. 4*a*-4*b*, and the lane change safety level determined in real time is then dynamically displayed using a pointer. In the dashboard shown in FIGS. 4*a*-4*b*, the road safety level may be classified as three levels, i.e. a primary safety level, an intermediate safety level and a high safety level.

In a feasible embodiment, the first lane change safety level and the second lane change safety level are lane change safety levels of different degrees of danger, and controlling an indicator to change from a lane change safety level determined at a previous moment to a lane change safety level determined at a current moment comprises: controlling the indicator to move from a first indication area corresponding to the first lane change safety level to a second indication area corresponding to the second lane change safety level.

Figure 4A:
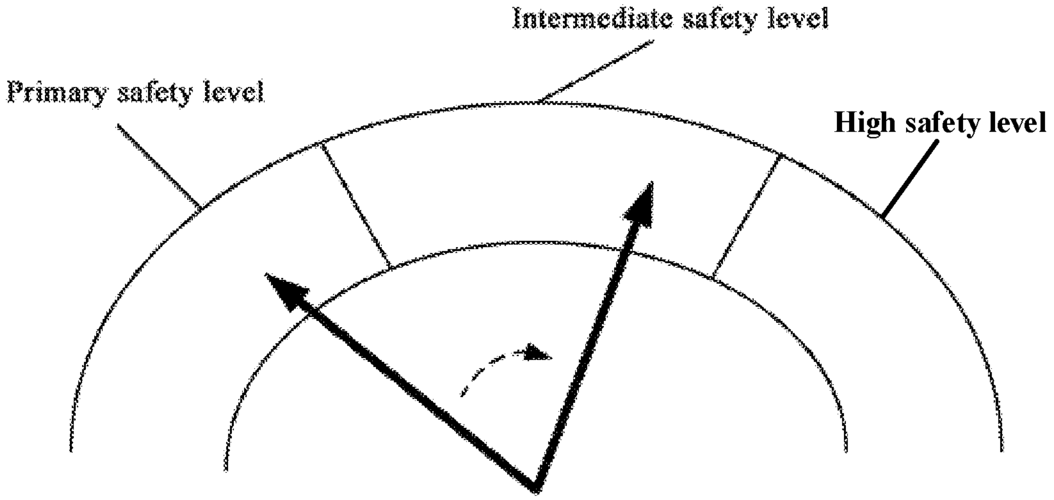
FIGS. 4*a* and 4*b* show dynamic displaying effect diagrams according to an embodiment of the present disclosure.

In an example, as shown in FIG. 4*a*, the dashboard configured to represent the road safety level is divided into a plurality of indication areas. The first lane change safety level is the primary safety level, the second lane change safety level is the intermediate safety level, and the primary safety level and the intermediate safety level correspond to different indication areas, respectively. When the lane change safety level changes from the first lane change safety level to the second lane change safety level, the pointer moves from the indication area corresponding to the first lane change safety level to the indication area corresponding to the second lane change safety level, so as to remind the driver of the vehicle about to change lanes of a change in the degree of danger corresponding to the current lane change behavior.

In another feasible embodiment, the first lane change safety level and the second lane change safety level are lane change safety levels of the same degree of danger, and controlling an indicator to change from a lane change safety level determined at a previous moment to a lane change safety level determined at a current moment comprises: controlling the indicator to move from a first indication position corresponding to the first lane change safety level to a second indication position corresponding to the second lane change safety level.

A distance between the first indication position and the second indication position is positively correlated to a degree of danger between the first lane change safety level and the second lane change safety level.

That is, the indication position of the road safety level in the dashboard is positively correlated to the degree of danger of the road safety level, i.e. the higher the degree of danger of the road safety level is, the closer an indication position corresponding thereto is to a danger identifier (Danger) of the dashboard; and the lower the degree of danger of the road safety level is, the closer an indication position corresponding thereto is to a safe identifier (Safe) of the dashboard.

Figure 4B:
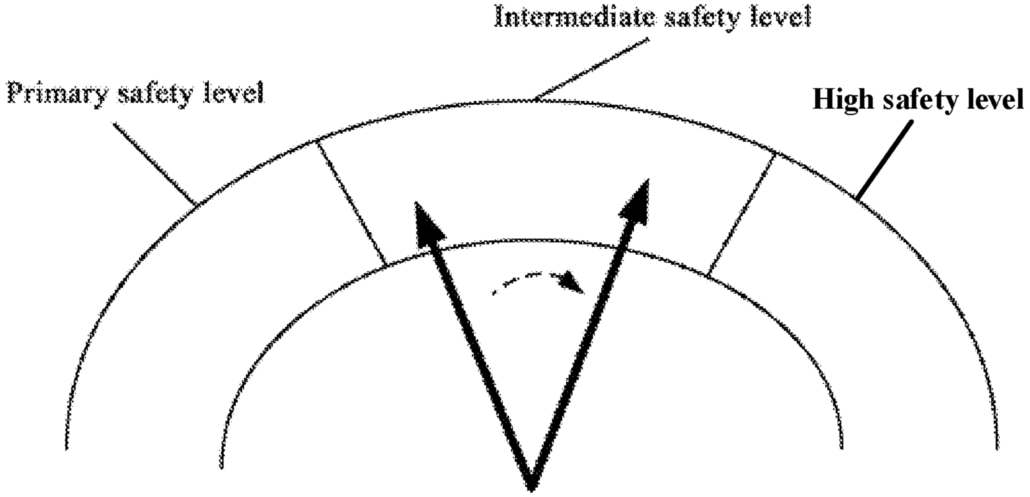

In an example, as shown in FIG. 4*b*, both the first lane change safety level and the second lane change safety level are the intermediate safety level, but the degree of danger of the first lane change safety level is lower and the degree of danger of the second lane change safety level is higher. Therefore, when the lane change safety level changes from the first lane change safety level to the second lane change safety level, the pointer moves from the indication position corresponding to the first lane change safety level to the indication position corresponding to the second lane change safety level, so as to remind the driver of the vehicle about to change lanes of the change in the degree of danger corresponding to the current lane change behavior.

It should be understood that in the embodiment of the present application, the lane change safety level determined in real time is dynamically displayed, which can effectively remind the driver of the vehicle about to change lanes to select a more suitable driving behavior, for example, when there're no other vehicles ahead on the target lane, the driver of the vehicle about to change lanes may select to continue the lane change according to the current lane change behavior when the road safety level is the primary safety level, select to speed up to change the lane when the road safety level is the intermediate safety level, or select to give up the current lane change opportunity when the road safety level is the high safety level, etc.

In a feasible embodiment, different lane change safety levels may be identified with different colors in the dashboard to give the driver a more visual reminding.

It should be understood that the color may reflect the degree of danger visually to cause a natural warning effect to the driving operation of the driver, especially when the same red, yellow and green colors as traffic lights are used, which can naturally suggest a danger level to the driver.

In an example, the primary safety level corresponds to a green area, the intermediate safety level corresponds to a yellow area, and the high safety level corresponds to a red area. The pointer moves in the areas of various colors when moving in the indication areas of the dashboard.

Thus, with the method for assisting in vehicle lane change proposed in the embodiments of the present application, by determining the lane change safety level corresponding to the current lane change behavior of the vehicle about to change lanes in real time and dynamically displaying the lane change safety level that is determined in real time, the driver can be enabled to dynamically receive information about changes in danger level throughout the entire lane change process, which thus effectively assists in making a real-time adjustment to the control over the vehicle according to a dynamic reminding, leading to improved convenience of the driver and comfort of a passenger.

Figure 5:
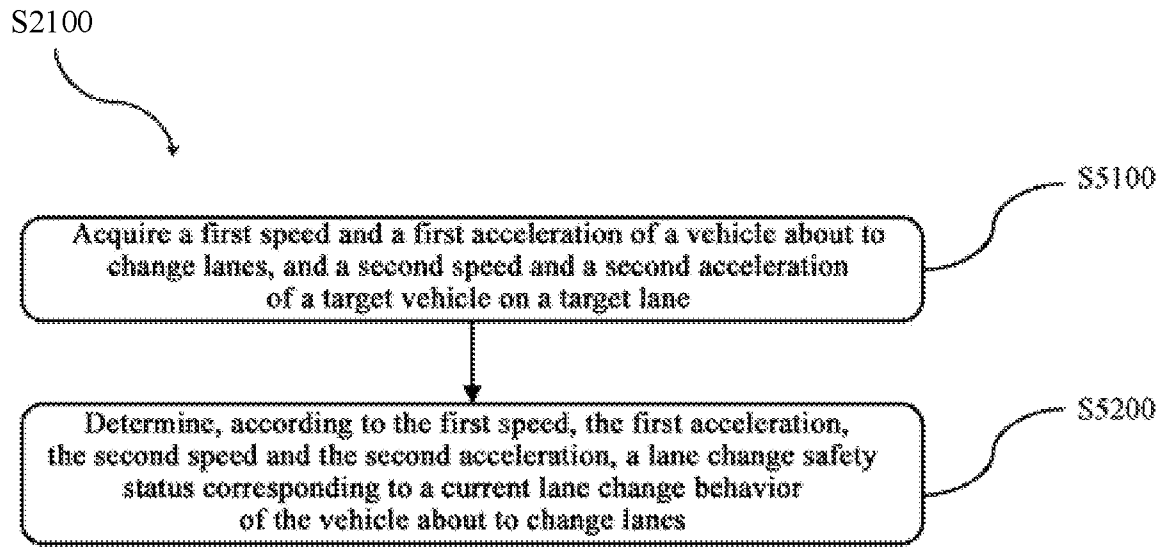
FIG. 5 shows another flowchart of a method for assisting in vehicle lane change according to an embodiment of the present disclosure.

In a feasible embodiment, with reference to FIG. 5, in a preferred embodiment of the present application, determining a lane change safety status corresponding to a current lane change behavior as shown in step S2100 in FIG. 2 comprises: S5100, acquiring a first speed and a first acceleration of a vehicle about to change lanes, and a second speed and a second acceleration of a target vehicle on a target lane.

It is to be noted that the first speed and the first acceleration of the vehicle about to change lanes may be acquired by sensors on the vehicle about to change lanes. For example, a speed sensor and an acceleration sensor are disposed on the vehicle about to change lanes, wherein the first speed of the vehicle about to change lanes is acquired by the speed sensor, and the first acceleration of the vehicle about to change lanes is acquired by the acceleration sensor. Alternatively, the first speed and the first acceleration of the vehicle about to change lanes may be acquired by a vehicle controller (or a vehicle-mounted terminal) of the vehicle about to change lanes.

It should be understood that in an embodiment of the present application, the first speed and the first acceleration of the vehicle about to change lanes are acquired in real time, for example, the first speed and the first acceleration of the vehicle about to change lanes are acquired in real time at a preset frequency. The preset frequency may be determined according to computing power of the server or the vehicle-mounted terminal, and the present application does not impose specific limitations thereto.

It should be further noted that the target lane is a lane where the vehicle about to change lanes is desired to change, and may be determined according to steering control of the driver, and then, at least one vehicle on the target lane closest to the vehicle about to change lanes is regarded as the target vehicle. In an example, when the driver triggers left steering control, a left adjacent lane to the lane where the vehicle about to change lanes is located is regarded as the target lane, and a vehicle on that lane ahead and/or behind the vehicle about to change lanes on the left is regarded as the target vehicle. When the driver triggers right steering control, a right adjacent lane to the lane where the vehicle about to change lanes is located is regarded as the target lane, and a vehicle on that lane ahead and/or behind the vehicle about to change lanes on the right is regarded as the target vehicle.

In a feasible embodiment, in a driving environment, the driver may better observe a driving situation of a vehicle ahead but cannot estimate the situation of a following vehicle due to the reasons such as a blind area, etc., and thus, the target vehicle is preferably the following vehicle on the target lane.

After the target vehicle on the target lane is determined, information of the target vehicle may be collected and analyzed to acquire the second speed and the second acceleration of the target vehicle.

In a feasible embodiment, the target vehicle communicates with the server through the vehicle-mounted terminal, and sends corresponding speed and acceleration thereof to the server in real time as the second speed and the second acceleration of the target vehicle.

Figure 6:
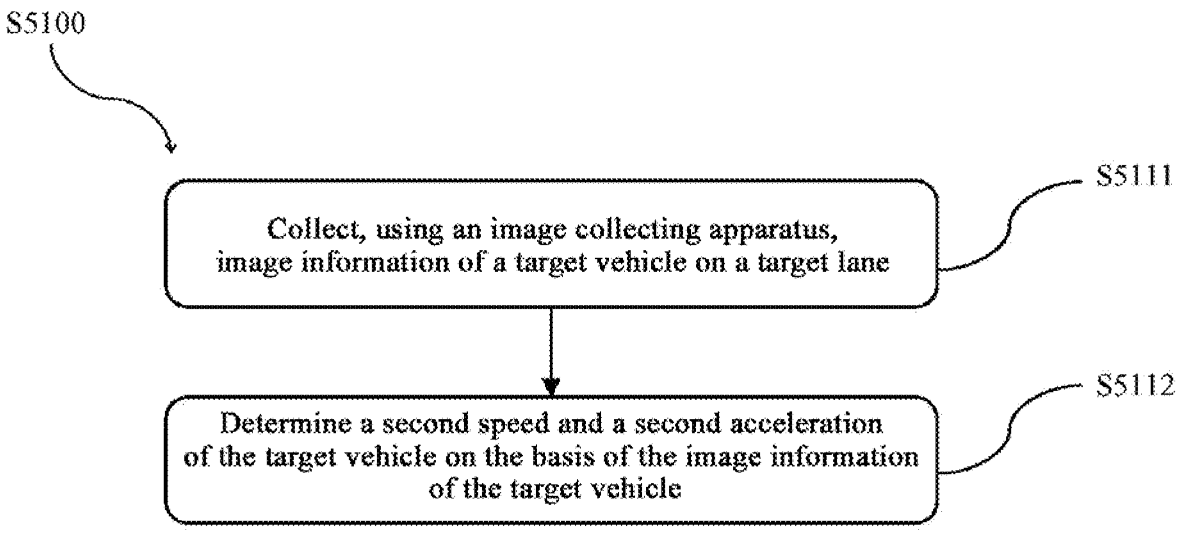
FIG. 6 shows yet another flowchart of a method for assisting in vehicle lane change according to an embodiment of the present disclosure.

In a feasible embodiment, with reference to FIG. 6, in a preferred embodiment of the present application, acquiring a second speed and a second acceleration of a target vehicle on a target lane as shown in step S5100 in FIG. 5 comprises:

S5111: collecting, using an image collecting apparatus, image information of the target vehicle on the target lane; and S5112: determining the second speed and the second acceleration of the target vehicle on the basis of the image information of the target vehicle.

That is, the image information of the target vehicle may be collected by the image collecting apparatus disposed on the vehicle body, and analyzed to determine the second speed and the second acceleration of the target vehicle.

In an example, at least two consecutive frames of image information of the target vehicle may be collected at a preset frequency, and is then analyzed to determine a travel distance of the target vehicle at a time interval of the preset frequency, and in turn to determine the second speed and the second acceleration of the target vehicle according to the time interval of the preset frequency and the travel distance of the target vehicle.

In a feasible embodiment, determining the second speed and the second acceleration of the target vehicle on the basis of the image information of the target vehicle further comprises: extracting feature information of the target vehicle on the basis of the image information, and determining the second speed and the second acceleration of the target vehicle by a speed analysis model constituted by a neural network. In particular, image information of at least two consecutive frames of the target vehicle are input to the speed analysis model constituted by a neural network, and the speed analysis model extracts features from the at least two consecutive frames of image information and analyzes a speed spectrum of the target vehicle through the neural network, so as to determine the second speed and the second acceleration of the target vehicle. As is known to those skilled in the art, there are many kinds of neural networks, e.g., a convolutional neural network (CNN) generally for processing images, a recurrent neural network (RNN) generally for time sequence data such as voice, etc., and a long/short-term memory (LSTM) generally for extracting timing relationships of upper and lower sets of data. In one or more embodiments of the present application, multiple neural networks for different purposes may be provided as different feature extraction models, and the input to each feature extraction model may be one or more speed spectra, and the input to each feature extraction model may be set as which speed spectrum (spectra) by setting each speed spectrum as the input to which feature extraction model(s). The feature extraction model may be created on the basis of learning of a plurality of speed spectrum samples, that is, the neural network is pre-trained using a large size of a respective type of data to obtain a model file, such that the feature extraction model may have a good feature extraction capability. Additionally, the neural network model may be updated by means of retraining or periodic data updating, etc., thereby ensuring the validity of the model.

Figure 7:
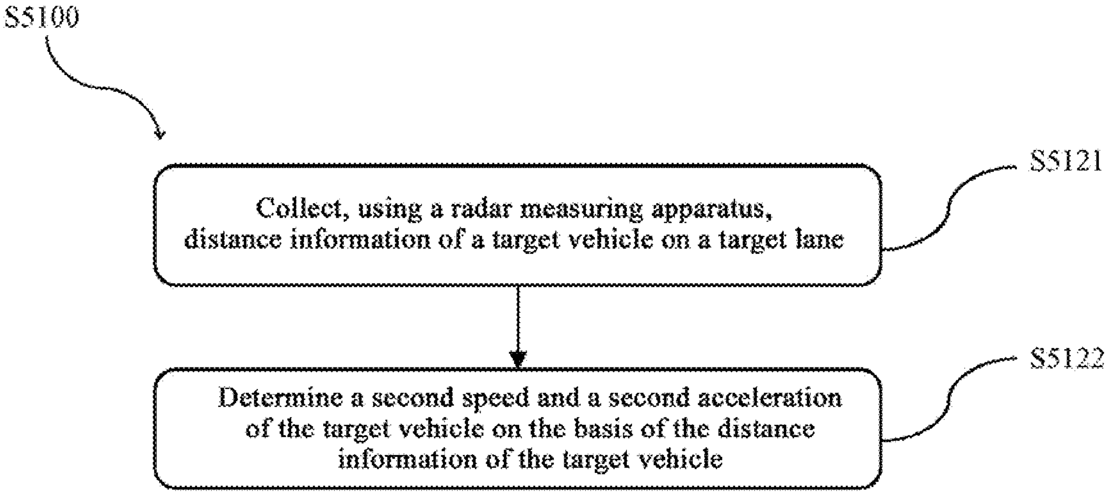
FIG. 7 shows still another flowchart of a method for assisting in vehicle lane change according to an embodiment of the present disclosure.

In a feasible embodiment, with reference to FIG. 7, in a preferred embodiment of the present application, acquiring a second speed and a second acceleration of a target vehicle on a target lane as shown in step S5100 in FIG. 5 comprises:

S5121: collecting, using a radar measuring apparatus, distance information of the target vehicle on the target lane; and

S5122: determining the second speed and the second acceleration of the target vehicle on the basis of the distance information of the target vehicle.

The radar measuring apparatus may be a millimeter-wave radar. In particular, the millimeter-wave radar emits an electromagnetic signal that is reflected to form an echo signal when encountering an obstacle (e.g., a vehicle ahead or a following vehicle). The millimeter-wave radar receives the echo signal and in turn determines the distance information between the target vehicle and the vehicle about to change lanes according to a receiving time of the echo signal and a propagation speed of an electromagnetic wave. Then, a Doppler shift of the echo signal is obtained on the basis of a Doppler principle according to continuous distance information between the target vehicle and the vehicle about to change lanes, and in turn, the second speed and the second acceleration of the target vehicle are determined.

At S5200, a lane change safety status corresponding to a current lane change behavior of the vehicle about to change lanes is determined according to the first speed, the first acceleration, the second speed and the second acceleration.

After the first speed and the first acceleration of the vehicle about to change lanes and the second speed and the second acceleration of the target vehicle on the target lane are obtained, the first speed, the first acceleration, the second speed and the second acceleration may be analyzed comprehensively to determine the lane change safety level corresponding to the vehicle about to change lanes.

Figure 8:
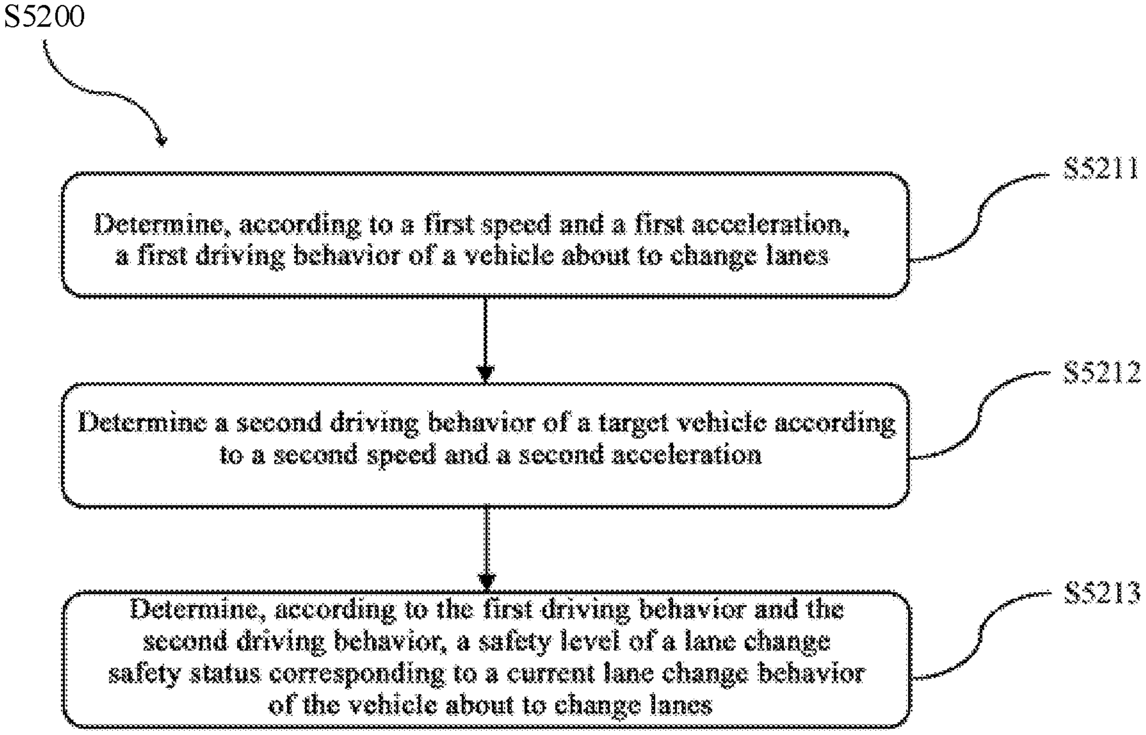
FIG. 8 shows a still further flowchart of a method for assisting in vehicle lane change according to an embodiment of the present disclosure.

In a feasible embodiment, with reference to FIG. 8, in a preferred embodiment of the present application, determining, according to the first speed, the first acceleration, the second speed and the second acceleration, a lane change safety status corresponding to a current lane change behavior of the vehicle about to change lanes as shown in step S5200 in FIG. 5 comprises:

S5211: determining, according to the first speed and the first acceleration, a first driving behavior of the vehicle about to change lanes; and

S5212: determining a second driving behavior of the target vehicle according to the second speed and the second acceleration.

It should be understood that the acceleration is information representing a driving speed change trend of the vehicle, and the driving behavior of the vehicle may be analyzed comprehensively according to the acceleration and speed information. For example, the acceleration increases with the increase of the speed, which means the vehicle speeds up by way of increased acceleration; or the acceleration decreases with the increase of the speed, which means that the vehicle speeds up by way of decreased acceleration; or an absolute value of the acceleration increases with the decrease of the speed (i.e. the acceleration increases in a negative direction), which means that the vehicle slows down by way of increased acceleration; or an absolute value of the acceleration decreases with the decrease of the speed (i.e. the acceleration decreases in a negative direction), which means that the vehicle slows down by way of decreased acceleration.

At S5213, a safety level of the lane change safety status corresponding to the current lane change behavior of the vehicle about to change lanes is determined according to the first driving behavior and the second driving behavior.

That is, the driving trend of the vehicle about to change lanes and the target vehicle may be determined by analyzing the first driving behavior and the second driving behavior, thereby determining the lane change safety level corresponding to the vehicle about to change lanes.

Figure 9:
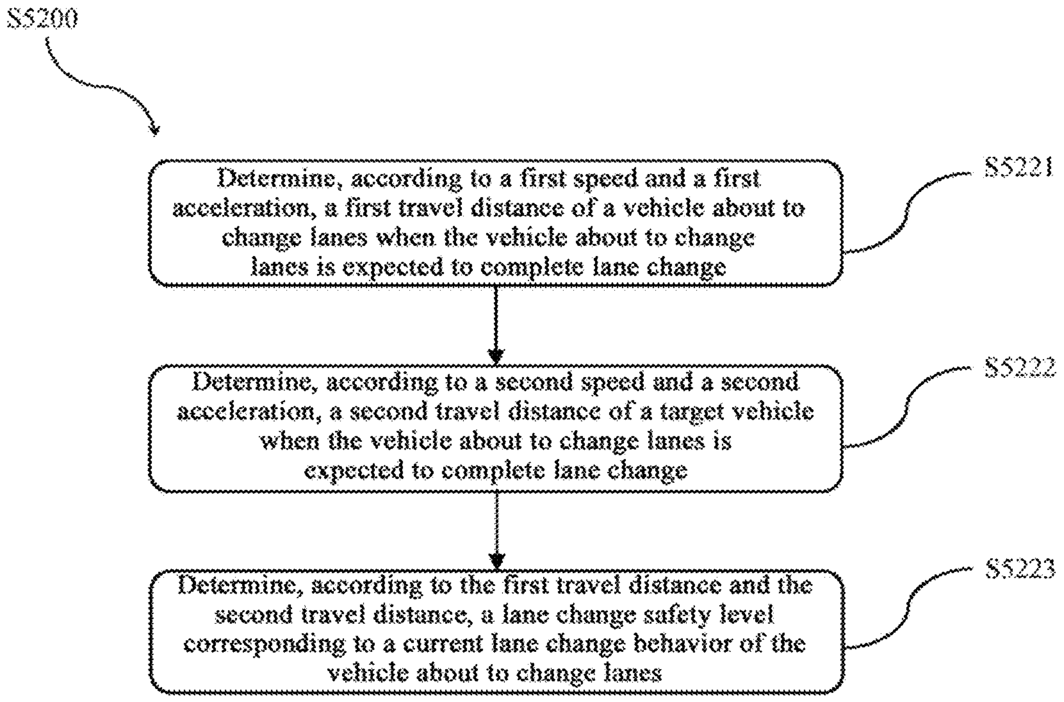
FIG. 9 shows a still further flowchart of a method for assisting in vehicle lane change according to an embodiment of the present disclosure.

In a feasible embodiment, with reference to FIG. 9, in a preferred embodiment of the present application, determining, according to the first speed, the first acceleration, the second speed and the second acceleration, a lane change safety level corresponding to the vehicle about to change lanes as shown in step S5200 in FIG. 5 comprises:

S5221: a first travel distance of the vehicle about to change lanes when the vehicle about to change lanes is expected to complete lane change is determined according to the first speed and the first acceleration.

It is to be noted that after the first speed and the first acceleration are acquired, the first travel distance of the vehicle about to change lanes when the vehicle about to change is expected to complete lane change, i.e. a distance for which the vehicle about to change lanes can travel within an expected completion time of the lane change, may be determined according to the first speed and the first acceleration.

$$Sa = V_a \cdot t + 1/2 \cdot a_a \cdot t^2$$

where Sa is the first travel distance, $V_a$ is the first speed, $a_a$ is the first acceleration, and t is the estimated time when the vehicle about to change lanes completes lane change. The estimated time when the vehicle about to change lanes completes lane change may be an estimated time calculated from the first speed and the first acceleration, or a fixed value measured and determined from an experiment.

At S5222, a second travel distance of the target vehicle when the vehicle about to change lanes is expected to complete lane change is determined according to the second speed and the second acceleration.

Similarly, after the second speed and the second acceleration are acquired, the second travel distance of the target vehicle when the vehicle about to change lanes is expected to complete lane change, i.e. a distance for which the target vehicle can travel when the vehicle about to change lanes is expected to complete lane change, may be determined according to the second speed and the second acceleration.

$$Sb = V_b \cdot t + 1/2 \cdot a_b \cdot t^2$$

where Sb is the second travel distance, $V_b$ is the second speed, $a_b$ is the second acceleration, and t is the estimated time when the vehicle about to change lanes completes lane change.

At S5223, a lane change safety level corresponding to the current lane change behavior of the vehicle about to change lanes is determined according to the first travel distance and the second travel distance.

That is, the lane change safety level corresponding to the vehicle about to change lanes may be determined according to the travel distances of the vehicle about to change lanes and the target vehicle. In an example where the target vehicle is a following vehicle on the target lane, if the second travel distance of the target vehicle is larger than the first travel distance of the vehicle about to change lanes, it means that the distance between the vehicle about to change lanes and the target vehicle is decreasing rapidly, and on the basis of the current driving trend, a danger of collision easily occurs, resulting in a low lane change safety level.

In a feasible embodiment, determining, according to the first travel distance and the second travel distance, a lane change safety level corresponding to the vehicle about to change lanes in S5223 comprises: acquiring an initial distance between the vehicle about to change lanes and the target vehicle; determining a predicted distance between the vehicle about to change lanes and the target vehicle according to the first travel distance, the second travel distance and the initial distance; and determining, according to the predicted distance, the lane change safety level corresponding to the current lane change behavior of the vehicle about to change lanes.

It should be understood that if the initial distance between the vehicle about to change lanes and the target vehicle is long enough, there is no danger of collision even if the first travel distance is smaller than the second travel distance. Therefore, to further improve the accuracy of determining the lane change safety level corresponding to the vehicle about to change lanes and to further increase the initial distance between the vehicle about to change lanes and the target vehicle, the predicted distance between the vehicle about to change lanes and the target vehicle is determined from the initial distance, and the lane change safety level corresponding to the vehicle about to change lanes is in turn determined from the predicted distance.

Figure 10:
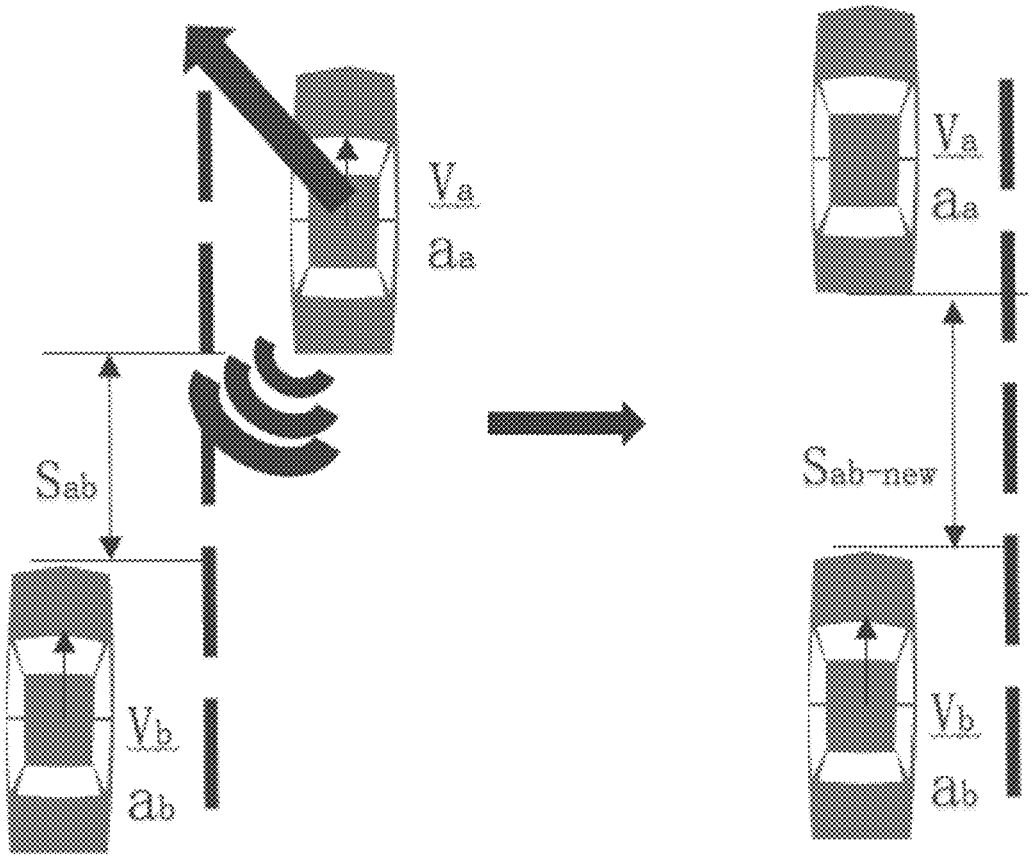
FIG. 10 shows a schematic diagram of lane change of a vehicle about to change lanes according to an embodiment of the present disclosure.

Preferably, the initial distance is a current distance between the vehicle about to change lanes and the target vehicle, i.e. a longitudinal distance between the vehicle about to change lanes and the target vehicle on the target lane at the current moment. The predicted distance is a distance between the vehicle about to change lanes and the target vehicle after the expected completion time t of lane change, i.e. the predicted distance between the vehicle about to change lanes and the target vehicle after the expected completion time t of lane change after the vehicle about to change lanes and the target vehicle travel according to the first speed and the first acceleration and the second speed and the second acceleration, respectively until the expected completion time t of lane change. In an example, as shown in FIG. 10, the predicted distance is a distance between the vehicle about to change lanes and a following target vehicle when the vehicle about to change lanes changes from a right lane at the current moment to a left lane at a next moment.

In an example, the predicted distance may be represented with the following expression:

$$Sab-\mathrm{new}=Sa-Sb+Sab$$

where Sa is the first travel distance, Sb is the second travel distance, Sab is the initial distance, and Sab-new is the predicted distance.

In a feasible embodiment, the lane change safety level corresponding to the vehicle about to change lanes may be determined according to the predicted distance and distance thresholds corresponding to various lane change safety levels.

In particular, the lane change safety levels correspond to multiple distance thresholds that are used to classify multiple lane change safety levels. In an example, if the predicted distance Sab-new is larger than a first distance threshold $S_{safe}$, it's determined that the lane change safety level corresponding to the vehicle about to change lanes is a primary safety level, which indicates that it's relatively safe for the vehicle about to change lanes to change a lane at the first speed and the first acceleration after the time t. If the predicted distance Sab-new is smaller than a second distance threshold $S_{danger}$, it's determined that the lane change safety level corresponding to the vehicle about to change lanes is a high safety level, which indicates that it's very dangerous for the vehicle about to change lanes to change a lane t at the first speed and the first acceleration after the time. If the predicted distance Sab-new is between the first distance threshold $S_{safe}$ and the second distance threshold $S_{danger}$, it's determined that the lane change safety level corresponding to the vehicle about to change lanes is an intermediate safety level, which indicates that it's somewhat dangerous for the vehicle about to change lanes to change a lane at the first speed and the first acceleration after the time t, and thus the driver needs to be highly cautious or needs to throttle up while keeping a safe distance ahead.

It is to be noted that the first distance threshold $S_{safe}$ and the second distance threshold $S_{danger}$ may be set as appropriate, for example, according to safe driving requirements in countries where the vehicle is launched, vehicle performance, etc. The present application does not impose specific limitations to specific numerical values of the first distance threshold $S_{safe}$ and the second distance threshold $S_{danger}$.

In some embodiments, it may break the rule, and a position to which the pointer points may be defined using a special algorithm in some special cases. For example, in a traffic congestion region, even if the calculated lane change safety level is the higher safety level, the primary safety level may be indicated as along as a following vehicle approaches 0 in speed or is slowing down, or a safe distance threshold corresponding to the weather may be used in the rainy and snowy weather, thereby effectively improving the reliability of reminding the lane change safety level in the rainy and snowy weather.

In a feasible embodiment, the driving variation of the target vehicle affects at least one future moment although the reminding of the lane change safety level enables the driver to predict in advance the degree of danger at the next moment when the lane is changed at the first speed and the first acceleration. For example, when a following speeds up by way of increased acceleration, although the degree of danger at the next moment may be low, the problem of a sharp decrease of the distance may occur due to the speed variation of the following vehicle at a moment after that moment, thereby affecting the driving safety.

On that basis, the embodiment of the present application further proposes to display the second acceleration and/or a variation trend of the second acceleration of the target vehicle to the driver.

Figure 11:
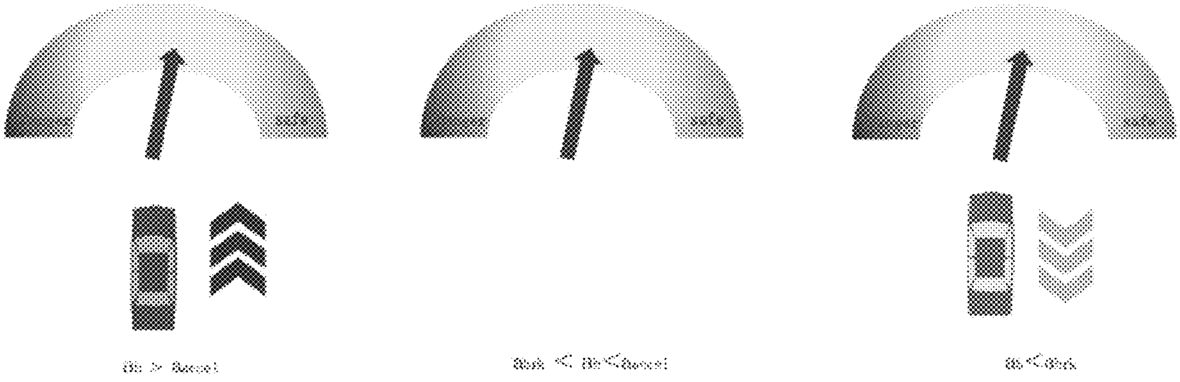
FIG. 11 shows a schematic structural diagram of a lane change warning light according to an embodiment of the present disclosure.

In an example, as shown in FIG. 11, the driver may be reminded of the acceleration of the target vehicle as a speed-up direction or a slow-down direction by means of an arrow, or may be reminded of the variation trend of the acceleration of the target vehicle, i.e. the acceleration being in an increase state or the acceleration being in a decrease state.

In a feasible embodiment, the arrow indication of the acceleration may also be displayed according to the relationship between the magnitude of the second acceleration and an acceleration threshold, wherein the acceleration threshold is used to indicate an acceleration situation of the target vehicle. In an example, the first acceleration threshold $a_{accel}$ indicates that the target vehicle is in a speed-up state, and the second acceleration threshold $a_{brk}$ indicates that the target vehicle is in a slow-down state. If the second acceleration is greater than the first acceleration threshold $a_{accel}$, an up arrow is displayed to remind the driver that the target vehicle is speeding up. If the second acceleration is less than the second acceleration threshold $a_{brk}$, a down arrow is displayed to remind the driver that the target vehicle is braking. For example, if the target vehicle travels at an approximately constant speed, acceleration thereof approaches 0 and is between the first acceleration threshold $a_{accel}$ and the second acceleration threshold $a_{brk}$. Therefore, if the second acceleration is between the first acceleration threshold $a_{accel}$ and the second acceleration threshold $a_{brk}$, no arrow is displayed to remind the driver that the target vehicle maintains a predicted driving trend without a driving behavior trend that requires additional attentions.

To sum up, by the method for assisting in vehicle lane change proposed in the embodiments of the present application, by determining the lane change safety level corresponding to the current lane change behavior of the vehicle about to change lanes in real time and dynamically displaying the lane change safety level that is determined in real time, the driver can be enabled to dynamically receive the information about changes in danger level throughout the entire lane change process, which thus effectively assists in making a real-time adjustment to the control over the vehicle according to a dynamic reminding, leading to improved convenience of the driver and comfort of a passenger.

Figure 12:
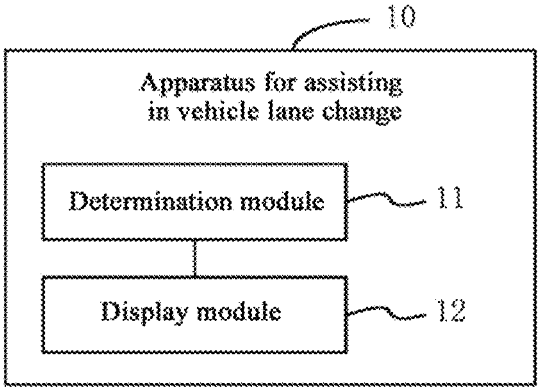
FIG. 12 shows a schematic structural diagram of an apparatus for assisting in vehicle lane change according to an embodiment of the present disclosure.

On the basis of the similar inventive concept, FIG. 12 shows a schematic structural diagram of an apparatus 10 for assisting in vehicle lane change according to an embodiment of the present disclosure. The apparatus 10 comprises:

a determination module 11, configured to determine a lane change safety status corresponding to a current lane change behavior of a vehicle; and a display module 12, configured to dynamically display the determined lane change safety status.

In some embodiments, the display module 12 is further configured to:

dynamically display a safety level of the lane change safety status in a display apparatus of the vehicle.

In some embodiments, the display module 12 is further configured to:

when the lane change safety level changes, control an indicator to change from a first lane change safety level determined at a previous moment to a second lane change safety level determined at a current moment.

In some embodiments, the first lane change safety level and the second lane change safety level are lane change safety levels of different degrees of danger, and the display module 12 is further configured to:

control the indicator to move from a first indication area corresponding to the first lane change safety level to a second indication area corresponding to the second lane change safety level.

In some embodiments, the first lane change safety level and the second lane change safety level are lane change safety levels of the same degree of danger, and the display module 12 is further configured to:

control the indicator to move a first indication position corresponding to the first lane change safety level to a second indication position corresponding to the second lane change safety level.

In some embodiments, a distance between the first indication position and the second indication position is positively correlated to a degree of danger between the first lane change safety level and the second lane change safety level.

In some embodiments, the determination module 11 is further configured to:

acquire a first speed and a first acceleration of the vehicle about to change lanes, and a second speed and a second acceleration of a target vehicle on a target lane; and determine, according to the first speed, the first acceleration, the second speed and the second acceleration, a lane change safety status corresponding to a current lane change behavior of the vehicle about to change lanes.

In some embodiments, the determination module 11 is further configured to:

determine, according to the first speed and the first acceleration, a first travel distance of the vehicle about to change lanes when the vehicle about to change lanes is expected to complete lane change;

determine, according to the second speed and the second acceleration, a second travel distance of the target vehicle when the vehicle about to change lanes is expected to complete lane change; and determine, according to the first travel distance and the second travel distance, a safety level of the lane change safety status corresponding to the current lane change behavior of the vehicle about to change lanes.

In some embodiments, the determination module 11 is further configured to:

acquire an initial distance between the vehicle about to change lanes and the target vehicle;

determine a predicted distance between the vehicle about to change lanes and the target vehicle according to the first travel distance, the second travel distance and the initial distance; and determine, according to the predicted distance, the lane change safety level corresponding to the current lane change behavior of the vehicle about to change lanes.

In some embodiments, the determination module 11 is further configured to:

determine, according to the predicted distance and distance thresholds of lane change safety levels corresponding to different degrees of danger, a lane change safety level corresponding to the current lane change behavior of the vehicle about to change lanes.

In some embodiments, the determination module 11 is further configured to:

collect, using an image collecting apparatus, image information of the target vehicle on the target lane; and determine the second speed and the second acceleration of the target vehicle on the basis of the image information of the target vehicle.

In some embodiments, the determination module 11 is further configured to:

collect, using a radar measuring apparatus, distance information of the target vehicle on the target lane; and determine the second speed and the second acceleration of the target vehicle on the basis of the distance information of the target vehicle.

In some embodiments, the determination module 11 is further configured to:

display the second acceleration and/or a variation trend of the second acceleration of the target vehicle in a central control panel or a head-up display system of the vehicle about to change lanes.

It may be understood that the structure shown in FIG. 12 is only illustrative, and the apparatus may also comprise more or fewer modules or assemblies than those as shown in FIG. 12, or have a different configuration from that as shown in FIG. 12.

Furthermore, the present application further provides a computer device. According to an embodiment of the present disclosure, the computer device may comprise a memory, a processor, and a computer program that is stored on the memory and is runnable on the processor, wherein the processor, when executing the program, may implement the steps of the method for assisting in vehicle lane change as described in the description.

Furthermore, the present application further provides a computer-readable medium which may be comprised in the apparatus as described in the embodiments above or may be present separately and be not assembled in the apparatus. The computer-readable medium above carries one or more programs which, when executed by the apparatus, enable the apparatus to perform the steps of the method for assisting in vehicle lane change as described in the description.

Furthermore, the present application further provides a computer program product comprising a computer instruction, wherein the computer instruction, when executed by a processor, may implement the steps of the method for assisting in vehicle lane change as described in the description.

In particular, the processes above of the embodiments as described with reference to the flowcharts in the drawings may be implemented as a computer software program. For example, the embodiment disclosed in the description of the present application comprises a computer program product which comprises a computer program carried on a computer-readable medium, wherein the computer program contains program codes for performing the methods as shown in the flowcharts in the drawings, and is executed by a processor to perform the method of the present application.

It is to be noted that the computer-readable medium as described in the present application may be a computer-readable signal medium, a computer-readable storage medium or any combination thereof. The computer-readable storage medium may, for example, include, but is not limited to, electrical, magnetic, optical, electromagnetic, infrared or semiconductor systems, means or apparatuses or any combination thereof. More particular examples of the computer-readable storage medium may include, but are not limited to, a computer disk, a hard disk, a random access memory (RAM), a read-only memory (ROM), an erasable programmable read-only memory (RPROM), a flash memory, a portable compact disk-read-only memory (CD-ROM), an optical storage device, a magnetic memory device or any suitable combination thereof.

In the present application, the computer-readable storage medium may be any tangible medium containing or storing a program that may be used by or with an instruction execution system, means or apparatus. However, in the present application, the computer-readable signal medium may be comprised in a baseband or act as a data signal propagated as part of a carrier, in which computer-readable program codes are carried. Such data signal propagated may be of multiple forms, including, but not limited to, an electromagnetic signal, an optical signal or any suitable combination thereof. The computer-readable signal medium may also be a computer-readable medium other than the computer-readable storage medium, which may send, propagate or transmit a program for use by or with the instruction execution system, means or apparatus. The program codes comprised in the computer-readable medium may be transmitted using any suitable medium, including, but not limited to, wirelessly, a wire, an optical cable, RF, or any suitable combination thereof.

One or more programming languages or a combination thereof may be used to compile the computer program codes for executing the operations of the present application, including an object-oriented programming language, such as Java, Smalltalk and C++, and a conventional procedural programming language such as "C" language or similar programming languages. The program codes may be fully executed on a user computer, partly executed on a user computer, executed as an independent software package, partly executed on a user computer and partly executed on a remote computer, or full executed on a remote computer or a server. In the case of the remote computer, the remote computer may be connected to the user computer over any kind of networks including a Local Area Network (LAN) or a Wide Area Network (WAN), or may be connected to an external computer (for example, through Internet connection using an Internet service provider).

The flowcharts and the block diagrams in the drawings show, by way of example, the system architectures, functions and operations possibly implemented by the systems, methods and computer program products of all embodiments of the present application. Each block in the flowcharts or the block diagrams may represent a module, program segment or part of a code, which contain one or more executable instructions for implementing the specified logical function. It is to be noted that in some alternative implementations, the functions as labeled in the blocks may occur in an order different from that as shown in the drawings. For example, two successive blocks may, in effect, be executed substantially in parallel, or may be executed in a reverse order sometimes, depending on the functions involved. It is also to be noted that each block in the block diagrams and/or flowcharts and a combination thereof may be implemented using an application-specific hardware-based system for performing specified functions or operations, or using a combination of an application-specific hardware and computer instructions.

The unit or module involved in the embodiments of the present application may be implemented by way of software or hardware. The described unit or module may also be disposed in a processor which, for example, may be described as a processor comprising a first acquisition module, a second acquisition module, a determination module, and a display module, etc. The designations of these units or modules do not impose limitations to them per se.

All documents as mentioned in the description may be cited in the present application as references as if each of them is cited in the description as a reference in its entirety.

Furthermore, it should be understood that, upon reading the description above of the present disclosure, those skilled in the art may make various changes or modifications to the present disclosure, and such equivalents shall fall within the scope of protection of the present disclosure as well.

The invention claimed is:

1. A method for assisting in vehicle lane change, comprising:

acquiring a first speed and a first acceleration of a vehicle about to change lanes, and a second speed and a second acceleration of a target vehicle on a target lane;

determining, according to the first speed and the first acceleration, a first travel distance of the vehicle about to change lanes when the vehicle about to change lanes is expected to complete lane change;

determining, according to the second speed and the second acceleration, a second travel distance of the target vehicle when the vehicle about to change lanes is expected to complete lane change;

determining, according to the first travel distance and the second travel distance, a safety level of a lane change safety status corresponding to a current lane change behavior of the vehicle about to change lanes; and dynamically displaying the determined lane change safety status.

2. The method for assisting in vehicle lane change according to claim 1, wherein dynamically displaying the determined lane change safety status comprises:

dynamically displaying a safety level of the lane change safety status in a display apparatus of the vehicle.

3. The method for assisting in vehicle lane change according to claim 2, wherein dynamically displaying the determined lane change safety level comprises:

when the lane change safety level changes, controlling an indicator to change from a first lane change safety level determined at a previous moment to a second lane change safety level determined at a current moment.

4. The method for assisting in vehicle lane change according to claim 3, wherein the first lane change safety level and the second lane change safety level are lane change safety levels of different degrees of danger, and controlling an indicator to change from a lane change safety level determined at a previous moment to a lane change safety level determined at a current moment comprises:

controlling the indicator to move from a first indication area corresponding to the first lane change safety level to a second indication area corresponding to the second lane change safety level.

5. The method for assisting in vehicle lane change according to claim 3, wherein the first lane change safety level and the second lane change safety level are lane change safety levels of the same degree of danger, and controlling an indicator to change from a lane change safety level determined at a previous moment to a lane change safety level determined at a current moment comprises:

controlling the indicator to move from a first indication position corresponding to the first lane change safety level to a second indication position corresponding to the second lane change safety level.

6. The method for assisting in vehicle lane change according to claim 5, wherein a distance between the first indication position and the second indication position is positively correlated to a degree of danger between the first lane change safety level and the second lane change safety level.

7. The method according to claim 1, wherein determining, according to the first travel distance and the second travel distance, a safety level of the lane change safety status corresponding to the current lane change behavior of the vehicle about to change lanes comprises:

acquiring an initial distance between the vehicle about to change lanes and the target vehicle;

determining a predicted distance between the vehicle about to change lanes and the target vehicle according to the first travel distance, the second travel distance and the initial distance; and determining, according to the predicted distance, a lane change safety level corresponding to the current lane change behavior of the vehicle about to change lanes.

8. The method according to claim 7, wherein determining, according to the predicted distance, a lane change safety level corresponding to the vehicle about to change lanes comprises:

determining, according to the predicted distance and distance thresholds of lane change safety levels corresponding to different degrees of danger, a lane change safety level corresponding to the current lane change behavior of the vehicle about to change lanes.

9. The method according to claim 1, further comprising:

collecting, using an image collecting apparatus, image information of the target vehicle on the target lane; and determining the second speed and the second acceleration of the target vehicle on the basis of the image information of the target vehicle.

10. The method according to claim 1, further comprising:

collecting, using a radar measuring apparatus, distance information of the target vehicle on the target lane; and determining the second speed and the second acceleration of the target vehicle on the basis of the distance information of the target vehicle.

11. The method according to claim 1, further comprising:

displaying the second acceleration and/or a variation trend of the second acceleration of the target vehicle in the display apparatus of the vehicle about to change lanes.

12. An apparatus for assisting in vehicle lane change, comprising:

a processor serving as a determination module, configured to acquire a first speed and a first acceleration of a vehicle about to change lanes, and a second speed and a second acceleration of a target vehicle on a target lane; determine, according to the first speed and the first acceleration, a first travel distance of the vehicle about to change lanes when the vehicle about to change lanes is expected to complete lane change; determine, according to the second speed and the second acceleration, a second travel distance of the target vehicle when the vehicle about to change lanes is expected to complete lane change; determine, according to the first travel distance and the second travel distance, a safety level of a lane change safety status corresponding to a current lane change behavior of the vehicle about to change lanes; and a display hardware serving as a display module, configured to dynamically display the determined lane change safety status.

13. A computer device, comprising a memory, a processor, and a computer program stored on the memory and runnable on the processor, wherein the processor, when executing the program, is configured to implement:

acquiring a first speed and a first acceleration of a vehicle about to change lanes, and a second speed and a second acceleration of a target vehicle on a target lane;

determining, according to the first speed and the first acceleration, a first travel distance of the vehicle about to change lanes when the vehicle about to change lanes is expected to complete lane change;

determining, according to the second speed and the second acceleration, a second travel distance of the target vehicle when the vehicle about to change lanes is expected to complete lane change;

determining, according to the first travel distance and the second travel distance, a safety level of a lane change safety status corresponding to a current lane change behavior of the vehicle about to change lanes; and dynamically displaying the determined lane change safety status.

* * * * *